United States Patent [19]

Hikosaka et al.

[11] Patent Number: 4,519,906
[45] Date of Patent: May 28, 1985

[54] APPARATUS FOR THE SEPARATION OF MAGNETIC AND NONMAGNETIC SOLID PARTICLES FROM A LIQUID

[75] Inventors: Shinichi Hikosaka, Tokyo; Kosho Murayama, Kawasaki; Shinichi Fukuura, Kawaguchi; Takaomi Yanase, Ichikawa; all of Japan

[73] Assignee: Dai Nippon Insatsu Kabushiki Kaisha, Tokyo, Japan

[21] Appl. No.: 533,062

[22] Filed: Sep. 15, 1983

Related U.S. Application Data

[63] Continuation of Ser. No. 380,871, May 21, 1982, abandoned.

[30] Foreign Application Priority Data

May 25, 1981 [JP] Japan .................................. 56-75414

[51] Int. Cl.³ ............................................. B01D 35/06
[52] U.S. Cl. .................... 210/223; 210/259; 210/312
[58] Field of Search ............... 210/222, 223, 695, 312, 210/357, 334, 253, 259, 498, 335, 336

[56] References Cited

U.S. PATENT DOCUMENTS

| 1,102,791 | 7/1914 | Overly | 210/312 |
|---|---|---|---|
| 2,800,230 | 7/1957 | Thoma | 210/223 |
| 3,804,257 | 4/1974 | Sommermeyer | 210/223 |
| 4,053,409 | 10/1977 | Kuhfuss, Jr. | 210/223 |

FOREIGN PATENT DOCUMENTS

| 946492 | 7/1956 | Fed. Rep. of Germany | 210/312 |
|---|---|---|---|
| 1221390 | 7/1966 | Fed. Rep. of Germany | 210/222 |
| 525837 | 5/1955 | Italy | 210/222 |

OTHER PUBLICATIONS

Cuno, The Cuno Engr. Corp., Meriden, CT, Feb. 10, 1956.

Primary Examiner—Richard V. Fisher
Assistant Examiner—W. Gary Jones
Attorney, Agent, or Firm—Koda and Androlia

[57] ABSTRACT

Apparatus suitable for the removal of solids from printing ink, among other liquids. Adopted to this end are a magnet assembly and a filter assembly. Comprising a row of permanent magnets enclosed in an elongated housing, the magnet assembly is suspended concentrically in a first liquid chamber of cylindrical shape having an inlet port at its bottom end and an overflow port at its top end. The ink is freed of magnetic solid particles while flowing upwardly through the first liquid chamber, and then overflows into a second liquid chamber in which the filter assembly is suspended centrally. The filter assembly comprises a multiplicity of flat rings or apertured discs, alternating with spacers, stacked on a core rod. Nonmagnetic solid particles still remaining in the ink are removed as it flows into the filter assembly. The cleaned ink leaves the apparatus through an outlet port in communication with the interior of the filter assembly. The solids captured by the filter assembly can be scraped off by revolving the rings or discs with the core rod.

6 Claims, 10 Drawing Figures

APPARATUS FOR THE SEPARATION OF MAGNETIC AND NONMAGNETIC SOLID PARTICLES FROM A LIQUID

This is a continuation of application Ser. No. 380,871, filed May 21, 1982, now abandoned.

BACKGROUND OF THE INVENTION

This invention relates to apparatus for the separation of both magnetic and nonmagnetic solids from a liquid such as, typically, printing ink by means of magnetic attraction and filtration. The solid-liquid separation apparatus in accordance with the invention also lends itself to the processing of petroleums, organic solvents, paints, dyes, etc., and to water purification.

Let us consider gravure printing as an illustration of the need for the removal of solid particles from printing ink. In gravure printing the image area is etched, engraved or otherwise created below the surface of the printing plate or cylinder in the form of tiny "cells" or depressions. The printing surface is flooded with ink and then wiped or scraped clean of excess ink by a steel blade, called a doctor, while the cells hold the ink below the surface. The ink is transferred from the cells to paper pressed against the surface.

If the gravure printing ink contains solid matter, therefore, it will become caught between the printing surface and the doctor and so prevent the proper functioning of the latter. Further, the arrested solids will cause the rapid or uneven wear and damage of both the printing surface and the doctor, materially shortening their useful life. The worm or damaged printing surface and doctor also impair the quality of the reproductions and even produce defective prints that must be discarded. These results greatly increase the manual labor of removing the arrested solids from between the printing surface and the doctor, reconditioning or replacing them, and inspecting the produced prints for defective ones. The consequent increase in printing costs is also a problem.

A complete removal of solid particles from gravure printing ink is the only possible solution to the foregoing problems. A variety of solid-liquid filters or separation devices have been suggested and used in the printing industry. Typical of these are meshed or screen filters, roll-up filters, stacked-ring filters, and a combination of a screen filter and magnetic means. All these devices have one drawback or another.

Screen filters rapidly deteriorate in their filtration capacity with the clogging of the pores. They must therefore be backwashed periodically to make them clean of accumulated solids, with the filtering operation suspended. Roll-up filters are easily ruptured by the liquid pressure. Being for a single use, moreover, they are expensive and also require a break in the filtering operation for the replacement of used rolls. Stacked-ring filters are available with facilities for reconditioning without interruption of filtering. However, they are limited in the size of particles that can be filtered off, and so are unable to capture fine iron or other metal particles which do much harm in gravure printing.

Known apparatus comprising both a screen filter and magnetic means for solid-liquid separation is also subject to several objections. One is the arrangement of the magnetic means in relation to the flow path of the liquid. As all of the liquid does not pass sufficiently close to the magnetic means in the prior art apparatus, the magnetic matter contained in the liquid is not separated therefrom to a desired degree. The screen filter for combined use with the magnetic means has its own disadvantages pointed out previously.

SUMMARY OF THE INVENTION

The present invention remedies the noted difficulties heretofore encounted in solid-liquid filtration or separation devices of the class under consideration and makes it possible to practically completely remove solid particles, both magnetic and nonmagnetic, from a liquid. The apparatus according to the invention is also notable for the ease of its maintenance and servicing.

Summarized briefly, the invention provides solid-liquid separation apparatus comprising an elongate magnet assembly mounted vertically and centrally in a first liquid chamber of correspondingly vertically elongated shape, and a generally cylindrical filter assembly mounted vertically and centrally in a second liquid chamber. The first liquid chamber has an inlet port at its lower end for the admission of the liquid to be cleaned, and an overflow port at its upper end for the overflow of the liquid out into the second chamber. Thus the elongate magnet assembly efficiently attracts iron and other magnetic matter contained in the liquid as the latter flows upwardly through its surrounding space. Nonmagnetic solids still remaining in the liquid are separated therefrom as it overflows into the second liquid chamber and passes the cylindrical filter assembly into its interior. The cleaned liquid is withdrawn from the interior of the filter assembly via an outlet port in direct communication therewith.

A preferred embodiment of the invention employs as the magnet assembly a row of permanent magnets enclosed in an elongate housing, and as the filter assembly a multiplicity of flat rings or apertured discs stacked up with interposition of spacers. The magnet assembly and the filter assembly are suspended from respective openable lids closing the tops of the first and second liquid chambers. Both assemblies can therefore be readily withdrawn from the liquid chambers together with the lids, thus permitting easy servicing. The stacked-ring filter assembly, in particular, admits of reconditioning in place, without necessitating a break in the processing of the liquid.

The solid-liquid separation capability of the apparatus constructed as in the foregoing is satisfactory for all practical purposes. Experiment has proved that gravure printing ink processed by the apparatus gives rise to no such troubles in printing as those set forth previously.

The above and other features and advantages of this invention and the manner of attaining them will become more apparent, and the invention itself will best be understood, from a study of the following description and appended claims taken together with the attached drawings showing the preferred embodiment of the invention.

DESCRIPTION OF THE PREFERRED EMBODIMENT

Figure 1:
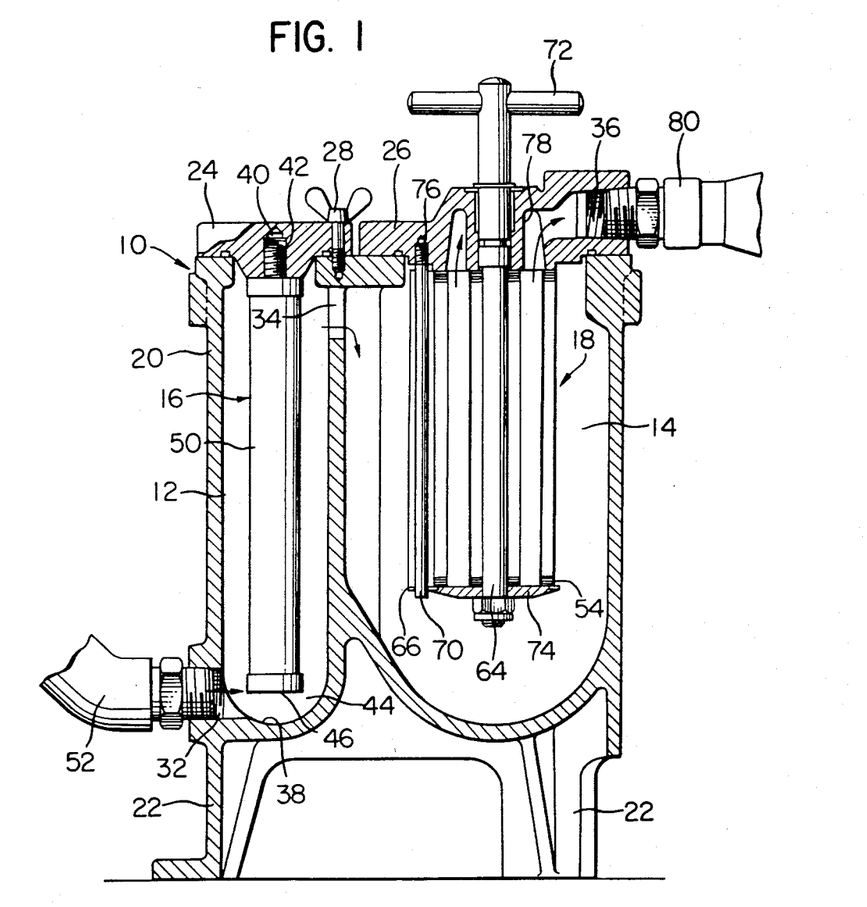
FIG. 1 is a vertical section through an example of the solid-liquid separation apparatus embodying the principles of the present invention.
Figure 2:
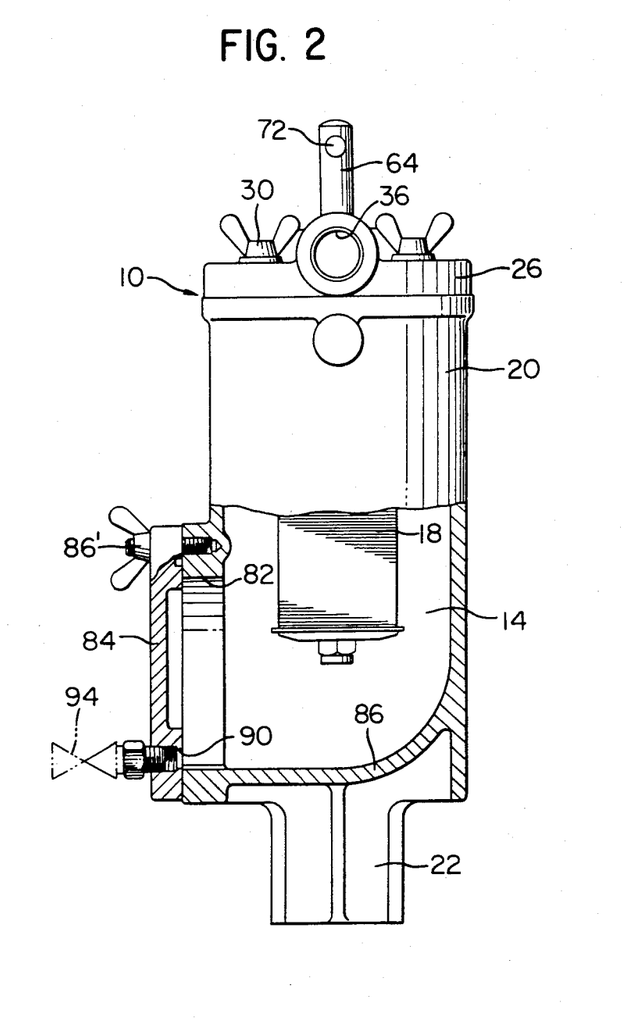
FIG. 2 is a right-hand side elevation, partly broken away and shown in section to reveal the inner details, of the separation apparatus of FIG. 1.
Figure 3:
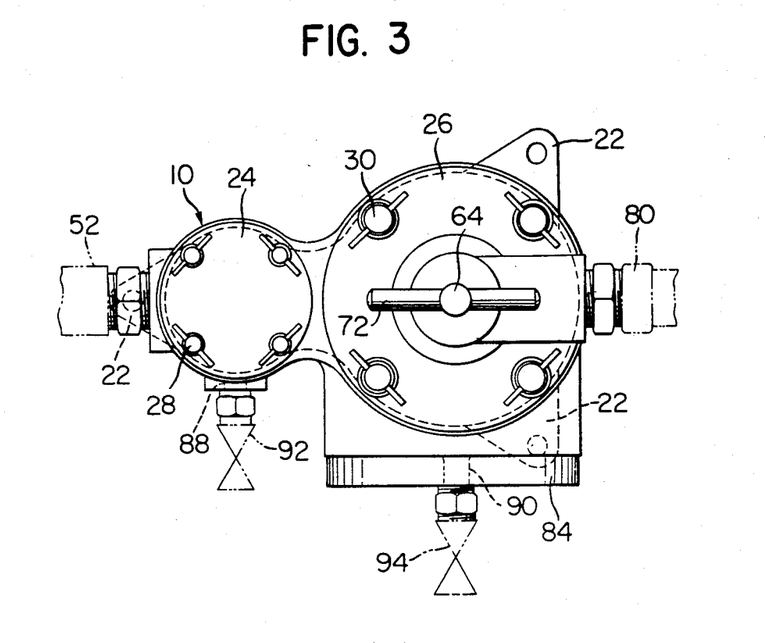
FIG. 3 is a top plan of the separation apparatus of FIG. 1.

The drawings illustrate the apparatus of this invention as adapted specifically for the removal of solid particles, both magnetic and nonmagnetic, from printing inks, although other liquids may likewise be processed by the same apparatus. With particular reference to FIGS. 1, 2 and 3 the illustrated apparatus broadly comprises:

1. a casing 10 defining first and second liquid chambers 12 and 14 for successively receiving the liquid to be cleaned;
2. a magnet assembly 16 in the first liquid chamber 12 for the removal of magnetic solids from the liquid; and
3. a filter assembly 18 in the second liquid chamber 14 for the separation of principally nonmagnetic solids from the liquid.

The casing 10 includes an open-top casing proper 20 standing on three legs 22, and first and second lids 24 and 26 openably and liquid-tightly closing the tops of the first and second liquid chambers 12 and 14 respectively. The lids 24 and 26 are readily removable by loosening threaded fastener elements 28 and 30. The casing proper 20 has formed therein an inlet port 32 open to the bottom end of the first liquid chamber 12 for the ingress of the liquid to be processed. Also formed in the casing proper 20 is an overflow port 34 intercommunicating the first and second liquid chambers 12 and 14 at their top ends for the overflow of the liquid from the former to the latter. The second lid 26 has formed therein an outlet port 36 for the egress of the cleaned liquid from the second liquid chamber 14, or from within the filter assembly 18 mounted therein, through an outlet pipe connector 80.

The first liquid chamber 12 is elongated vertically, preferably in the shape of an upstanding cylinder, with a rounded bottom 38. Also preferably cylindrical in shape, the magnet assembly 16 is suspended vertically and concentrically in the first liquid chamber 12 from the first lid 24 by having its mounting screw 40 screwed into a tapped bore 42 in the first lid. Consequently, as this lid is removed from the casing proper 20 by loosening the threaded fastener elements 28, the magnet assembly 16 can be readily withdrawn from the first liquid chamber 12. A clean space 44 exists between the lower extremity 46 of the magnet assembly 16 and the rounded bottom 38 of the first liquid chamber 12. This space serves to produce a smooth inflow of the liquid from the inlet port 32 into the chamber.

Figure 4:
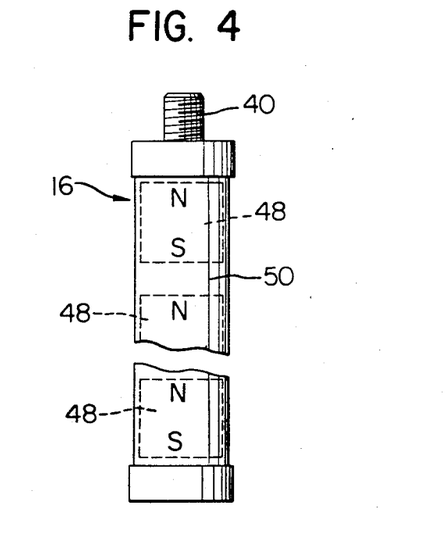
FIG. 4 is an enlarged elevation, partly broken away for illustrative convenience, of the magnet assembly in the separation apparatus of FIG. 1.

FIG. 4 illustrates the details of the magnet assembly 16 on an enlarged scale. It comprises a plurality of permanent magnets 48 enclosed in a row in a cylindrical magnet housing or holder 50 of nonmagnetic material. The mounting screw 40 projects upwardly from the top of the magnet housing 50.

With reference back to FIG. 1 in particular, the concentric arrangement of the cylindrical magnet assembly 16 in the cylindrical first liquid chamber 12 constitutes one of the most pronounced features of this invention. Flowing smoothly from an inlet conduit 52 into the clear space 44 of the first liquid chamber 12, aided by its rounded bottom 38, the ink or other liquid to be processed streams upwardly through the tubular space around the magnet assembly 16. The iron and other magnetic solid particles in the liquid are thus effectively attracted by the magnet assembly and so separated from the liquid.

In designing the apparatus the diameter or cross sectional size of the interior of the first liquid chamber 12 in relation to that of the magnet assembly 16 merits careful consideration. Should the chamber diameter be too large, the magnet assembly would not efficiently attract the magnetic particles in the liquid even though the liquid velocity is low. Should the chamber diameter be too small, on the other hand, the magnet assembly would also fail to attract a sufficient proportion of the magnetic particles because of the increased velocity of the liquid.

Factors other than liquid velocity also enter into the determination of the relative diameters of the first liquid chamber 12 and the magnet assembly 16. These are the viscosity and specific gravity of the liquid to be cleaned. Take, for example, gravure printing ink with a viscosity of 50 centipoises and a specific gravity of 1.0. If this ink is to flow through the first liquid chamber 12 at a speed of 10 millimeters (mm) per second, and if the magnet assembly 16 has a diameter of 26 mm, then the diameter of the first liquid chamber can normally be from about five to 50 mm, preferably from about 10 to 20 mm, more than that of the magnet assembly.

Printing ink may contain magnetic, notably iron, particles ranging in size from only several micrometers to well over 100 micrometers. Experiment indicates that approximately 98 percent of such magnetic particles can be caught by the magnet assembly 16 when the ink is passed through the first liquid chamber 12 at a rate required for printing.

Thus nearly completely freed from magnetic solids, the liquid overflows from the first liquid chamber 12 into the second liquid chamber 14 via the overflow port 34. The overflowing liquid will leave no bubbles in the first liquid chamber 12. The second liquid chamber 14 accommodates the filter assembly 18 for the separation of nonmagnetic as well as residual magnetic, if any, matter from the liquid.

Figure 5:
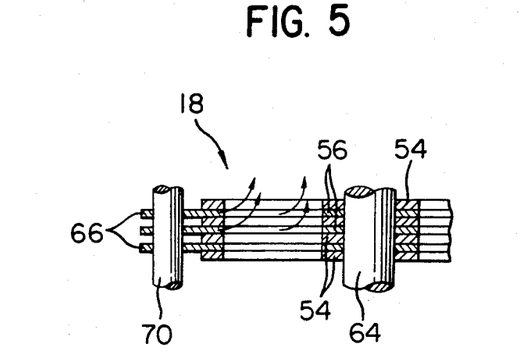
FIG. 5 is an enlarged, fragmentary section through the filter assembly in the apparatus of FIG. 1.
Figure 6:
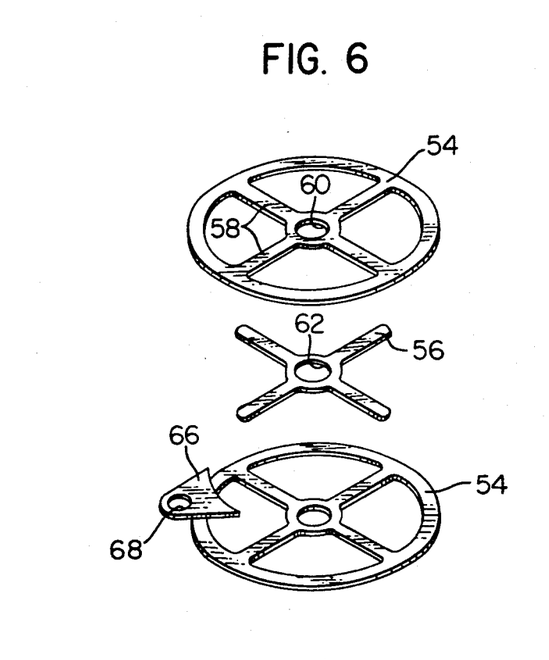
FIG. 6 is an exploded perspective view showing parts of the filter assembly of FIG. 5.

FIGS. 5 and 6 are detailed representations, in vertical section and in exploded perspective, of parts of the filter assembly 18. The particular filter medium employed in this embodiment is a stack of a multiplicity of flat rings or apertured discs 54 spaced from each other by the order of micrometers with spacers 56. The stacked rings or discs 54 will be hereinafter referred to as the filter rings. Each filter ring 54 is formed integral with two support strips 58 arranged diametrically and crosswise with each other. At the junction of the two support strips there is formed a through hole 60 located centrally of the complete filter ring 54. Each spacer 56 is of cruciate shape, having a through hole 62 at the junction of its limbs. The holes 60 of the filter rings 54 and the holes 62 of the spacers 56 closely receive a core rod 64, so that the filter rings and spacers revolve with the core rod. The thus stacked filter rings 54 have their support strips 58 in register with the limbs of the interposed spacers 56.

Seen at 66 in FIGS. 5 and 6 are scraper blades of sectorial shape, partly caught between the peripheral portions of the adjoining filter rings 54. Each scraper blade 66 hs a through hole 68 closely receiving a support rod 70 oriented parallel to the core rod 64.

As will be seen by referring back to FIG. 1, the core rod 64 of the filter assembly 18 extends upwardly, rotatably and liquid-tightly, through the second lid 26 and is further projects out of the lid. A handlebar 72 is affixed to the projecting end of the core rod 64. The core rod 64 carries a rigid support disc 74 at its bottom end for supporting the stack of filter rings 54, together with the interposed spacers 56, and holding the same against the inside surface of the second lid 26. The support rod 70 of the scraper blades 66, on the other hand, is threadedly engaged at its top end 76 in a tapped bore in the second lid 26. By turning the handlebar 72, therefore, the stack of filter rings 54 revolves with the core rod 64 in sliding contact with the scraper blades 66. Thus the scraper blades function to scrape off the solids clogging the spacings between the filter rings 54. The stacked-ring filter may be so reconditioned without interruption of the filtering operation.

It will be seen that the filter assembly 18 is generally cylindrical in shape and is mounted vertically and centrally in the second liquid chamber 14 which also is substantially in the shape of an upstanding cylinder. Overflowing into this second liquid chamber from the overflow port 34, the liquid first fills the outer space of the filter assembly 18 because of the resistance offered thereby against liquid flow therethrough. Only then does the liquid find its way into the filter assembly 18, together with bubbles, through the spacings between its filter rings 54 and so is freed of non-magnetic solids.

The filtrate flows from within the filter assembly 18 into the outlet port 36 through an annular passage 78 in the second lid 26. Since the liquid leaves no bubbles in the second liquid chamber 14, the filter assembly 18 performs its function to the full throughout its entire working surface.

The spacings between the filter rings 54 of the filter assembly 18 should be determined in consideration of the expected size of solid particles to be filtered out. Unnecessarily small spacings would cause the filter assembly to offer too much resistance to the passage of the liquid, possibly resulting in damage to the filter rings if the liquid pressure is high. It would also be difficult and costly to manufacture the filter assembly with such small spacings between the filter rings. Should the spacings be too great, on the other hand, then the filter assembly would be unable to arrest particles of intended size.

Usually, for the filtration of printing inks, the spacings between the filter rings can each be from about 25 to 150 micrometers, preferably from about 50 to 100 micrometers. These values presuppose, of course that the liquid to be filtered has been pretreated with the magnet assembly 16. As has been stated, iron and other solid particles contained in printing inks in general range in size from several micrometers to more than 100 micrometers. The filter assembly 18 cannot possibly capture the finer ones of these solid particles. The combined use of the magnet assembly 16 and filter assembly 18 as suggested by the invention is therefore essential for the thorough removal of such metal particles, which are especially objectionable in the use of the ink for gravure printing.

The handlebar 72 may be turned as required in order to clean the filter assembly 18 of the solids caught between its filter rings 54. The filter assembly 18 itself can be readily withdrawn from the second liquid chamber 14 by disconnecting the pipe connector 80 from the second lid 26 and by loosening the fastener elements 30.

The solids that have been scraped off the filter rings 54 as described above deposit and accumulate on the bottom of the second liquid chamber 14. For the discharge of such solids there is provided a circular discharge opening 82 (FIG. 2) which is located at the lower end portion of the second liquid chamber 14. Screwed at 86' to the casing proper 20 as in FIGS. 2, 3 and 7, a cover 84 openably closes the discharge opening 82. It will be noted from FIG. 2 that the bottom 86 of the second liquid chamber 14 is curved arcuately, sloping downwardly as it extends toward the discharge opening 82, in order to expedite the discharge of the accumulated solids.

Figure 7:
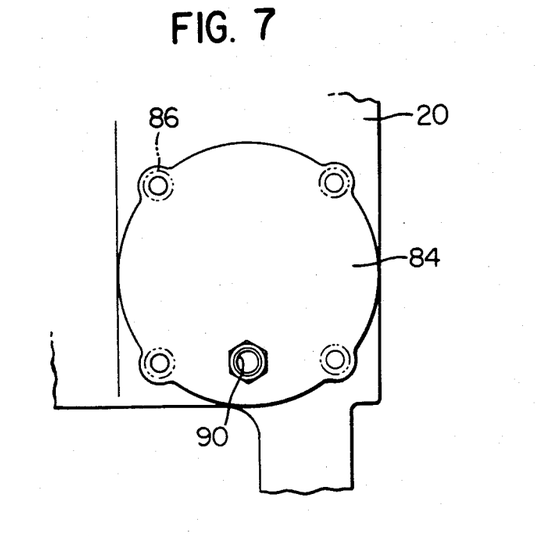
FIG. 7 is a fragmentary front elevation of the apparatus of FIG. 1, showing in particular the cover openably closing the discharge opening of the second liquid chamber.

Both the first and second liquid chambers 12 and 14 must be drained for processing a liquid different from the one that has been being cleaned. FIGS. 2, 3 and 7 also show drain ports 88 and 90 open to the bottom ends of the respective chambers 12 and 14. The drain port 88 is formed in the casing proper 20, whereas the other drain port 90 is formed in the cover 84 closing the discharge opening 82 of the second liquid chamber 14. These drain ports are both fitted with drain valves or cocks 92 and 94 for easy manual handling. FIG. 3 indicates that the two cocks lie sufficiently close together to make it possible to draw the liquid from both liquid chambers 12 and 14 into a single receptacle.

Figure 8:
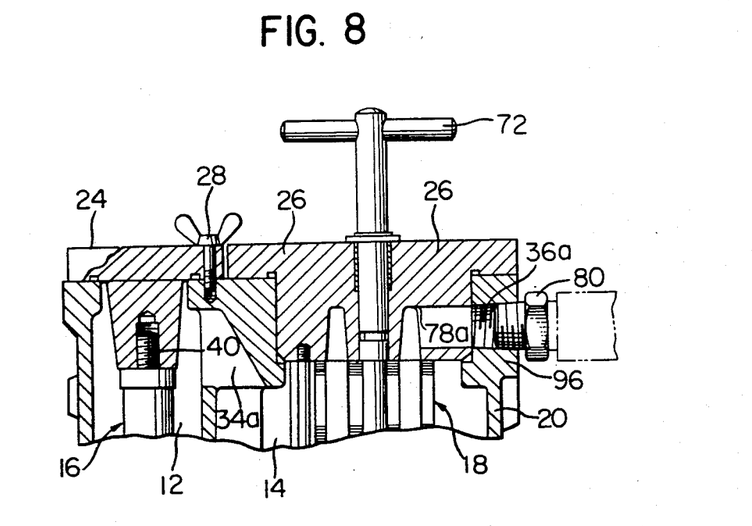
FIG. 8 is a fragmentary vertical section, corresponding to FIG. 1, through an alternative form of the apparatus in accordance with the invention.

FIG. 8 is a fragmentary section through an alternative form of the apparatus in accordance with the invention, incorporating some modifications of the preceding embodiment of the invention. One of the modifications resides in the placement of the overflow port herein designated 34a. It will be observed that the overflow port 34a is open to the first liquid chamber 12 at a point above the upper extremity of the magnet assembly 16 suspended therein. This placement of the overflow port makes it possible for the magnet assembly to make utmost use of its axial dimension for the attraction of magnetic particles.

The apparatus of FIG. 8 also features an outlet port 36a formed in a thickened rim 96 of the casing proper 20, instead of in the second lid 26 as in FIG. 1. The outlet port 36a communicates with the interior of the filter assembly 18 via a passage 78a in the lid 26. The creation of the outlet port 36a in the casing proper 20 eliminates the need for the disengagement of the pipe connector 80 therefrom in withdrawing the filter assembly 18 from the second liquid chamber 14 by opening the second lid 26.

The following experiment evidences how completely the apparatus of this invention can remove solid particles from printing ink. The particular ink processed by the apparatus was oleaginous gravure printing ink. The cleaned ink was used in printing by a gravure printing press having a chromium-plated printing cylinder and steel doctor blade. The revolving speed of the printing cylinder was 200 revolutions per minute. The doctor blade created no stains even after a run of 400,000 meters.

By way of comparison the same ink, not processed by the apparatus, was used for printing under the same conditions as above. The doctor blade did stain the printing surface almost immediately upon commencement of printing. As the printing was continued, the doctor blade scarred the printing surface at approximately 5,000 revolutions, making the same unusable.

Figure 9:
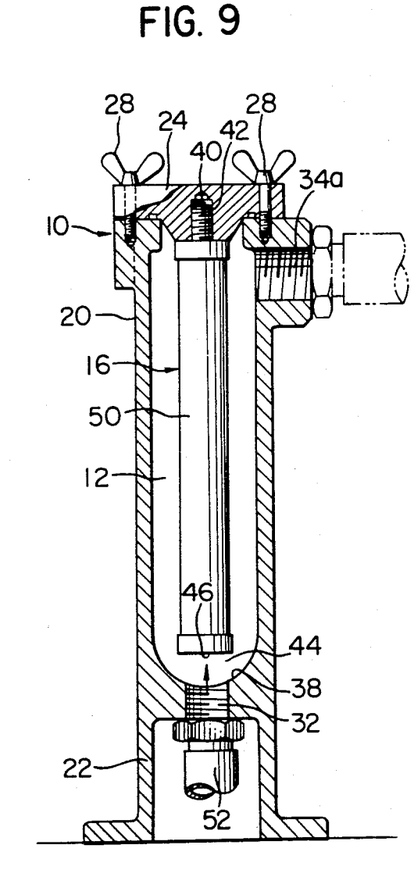
FIG. 9 is a vertical section of a solid-liquid separation apparatus made up of only a lefthand-side half of the apparatus shown in FIG. 1.
Figure 10:
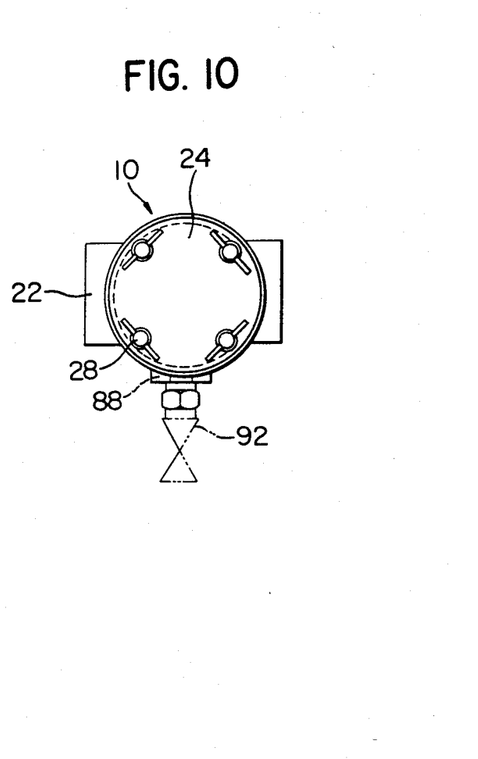
FIG. 10 is a top plan of the apparatus of FIG. 9.

FIGS. 9 and 10 illustrate an apparatus for the separation of magnetic solid particles from a liquid. This apparatus is made up of only a lefthand-side half of the apparatus shown in FIGS. 1 through 3. This means that the lefthand-side half of the apparatus of FIGS. 1 through 3 can be used independently for the separation of only the magnetic solid particles. Since the casing part defining the second liquid chamber 14 and the filter assembly 18 are dispensed with in the apparatus of FIGS. 9 and 10, an overflow port 34a, corresponding to the overflow port 34 shown in FIG. 1, is so modified that it serves as an outlet port to be connected to an outlet conduit (not shown), through which liquid free from magnetic particles is discharged. In this apparatus the inlet port 32 is formed in the bottom wall of the casing.

What is claimed is:

1. Apparatus for the separation of solid particles from a liquid, comprising:
    means defining a vertically extending first cylindrical liquid chamber having a top and a downwardly concave rounded bottom and means defining an inlet port for the liquid which is formed adjacent to the rounded bottom;
    a magnet assembly disposed vertically and concentrically in the first liquid chamber for the removal of magnetic solid particles from the liquid, said magnet assembly including a cylindrical housing, suspended from the top of the first liquid chamber and extending downwardly defining a space between a lower extremity of said magnet assembly and the rounded bottom, and a plurality of magnets enclosed in a row in the housing;
    a vertically extending second cylindrical liquid chamber disposed adjacent to the first liquid chamber and having a top and a downwardly concave bottom;
    overflow port means provided between the top portions of the first and second liquid chambers for passing therethrough an overflow of the liquid from within the first liquid chamber into the second liquid chamber;
    a vertically extending hollow cylindrical filter assembly for the removal of nonmagnetic particles, said filter assembly being suspended from the top of the second liquid chamber and terminating short of the bottom of the second liquid chamber;
    outlet port means communicating with the interior of said cylindrical filter assembly for the withdrawal of the liquid which has passed through the filter assembly;
    means forming a discharge opening provided through a side wall of a lower end portion of the second liquid chamber and directed horizontally, said downwardly concave bottom of the second liquid chamber having a portion arcuately sloping downwardly and extending horizontally to the lower part of the discharge opening to expedite the discharge of accumulated solid in the second liquid chamber, the discharge opening being of a transverse size on the order of the diameter of the second liquid chamber;
    a cover in the form of a plate screwed to the outer surface of said side wall of the second liquid chamber so as to close the discharge opening and having means defining a horizontal drain port in the lower part of said cover; and
    a drain cock connected to said drain port.

2. Apparatus as claimed in claim 1, wherein the first and second liquid chambers have first and second lids screwed to the upper ends of the first and second liquid chambers respectively to close these chambers from above.

3. Apparatus as claimed in claim 2, wherein the filter assembly is suspended from the second lid and the outlet port means is formed in the second lid.

4. Apparatus as claimed in claim 2, wherein the filter assembly is suspended from the second lid and the outlet port means is formed in the casing proper and communicates with the interior of the filter assembly via a passage formed in the second lid.

5. Apparatus as claimed in claim 3, wherein the filter assembly comprises a core rod rotatably supported by the second lid, a stack of spaced-apart filter rings carried by the core rod for simultaneous rotation therewith, and a plurality of scraper blades immovably supported by the second lid and each slidably engaged between two adjacent ones of the filter rings for scraping off solids therefrom as the filter rings are revolved with the core rod.

6. Apparatus as claimed in claim 1, wherein the overflow port means is located above the upper extremity of the magnet assembly.

* * * * *